Sept. 20, 1955 R. P. LAPSLEY 2,718,542
ELECTRIC CABLE SYSTEMS
Filed Oct. 19, 1949
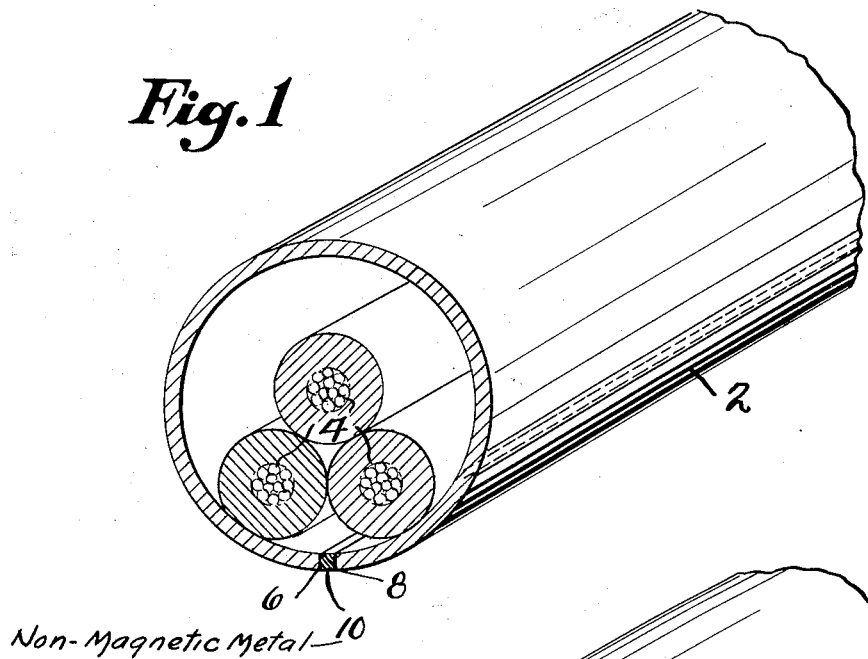
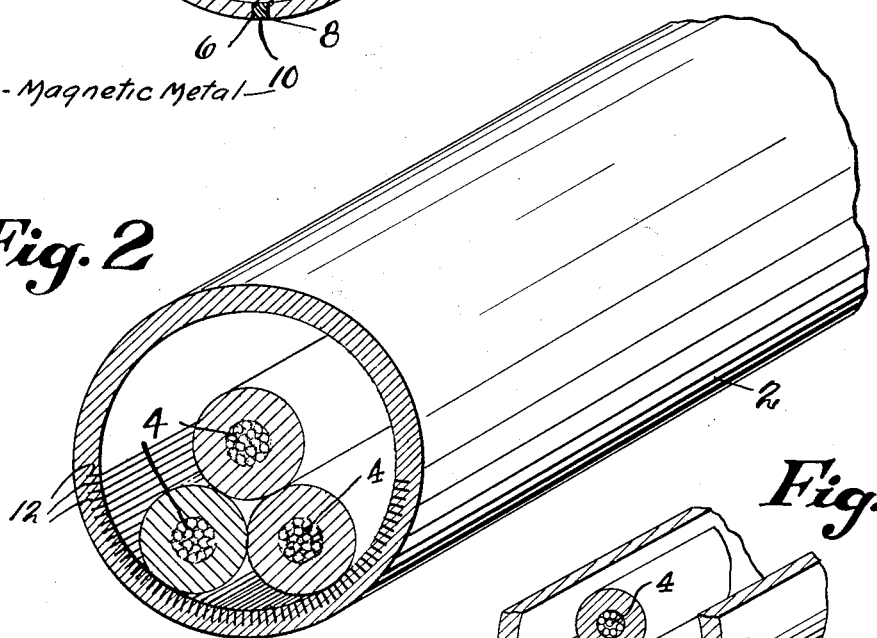
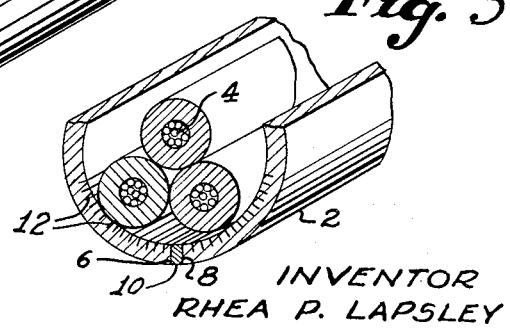
INVENTOR
RHEA P. LAPSLEY
BY
James G. Bethell
ATTORNEY

United States Patent Office 2,718,542
Patented Sept. 20, 1955

2,718,542

ELECTRIC CABLE SYSTEMS

Rhea P. Lapsley, Rutherford, N. J., assignor to The Okonite Company, Passaic, N. J., a corporation of New Jersey Application October 19, 1949, Serial No. 122,319

4 Claims. (Cl. 174—35)

My invention relates to power frequency polyphase electric power cables of the type wherein a plurality of insulated conductors is loosely encased within a raceway, such as a pipe for example, of magnetic material.

Power frequency is defined as 75 cycles per second or less. The power frequency in most widespread commercial use is 60 cycles per second, although 25 cycle and 50-cycle systems are common.

One of the objects of my invention is to provide a raceway which is of such construction as to reduce the magnitude of the energy losses occurring in the raceway wall and within the cable.

A further object of my invention is to reduce the resistance and reactance of the cable circuit, thereby to reduce the voltage drop occurring within the cable circuit.

A still further object of my invention is to provide a raceway construction whereby the cable circuit can carry more load current.

In the accompanying drawings,

Fig. 1 is a part-sectional isometric view of one embodiment of my invention;

Fig. 2 is a similar view of another embodiment of the invention; and

Fig. 3 is a fragmentary view showing the embodiments of Figs. 1 and 2 combined in the one structure.

For clarity of description and simplicity of explanation, my invention will be described in connection with three-phase power circuits. It is to be understood, however, that my invention is applicable to other types of alternating current systems.

In conventional practice, where three insulated cable conductors are loosely encased within a raceway of magnetic material and a three-phase alternating current is passed over the conductors, a two-pole magnetic field is created within the raceway and extends the full length of the same.

The strength of this magnetic field increases as the amperes of current flowing in the conductors are increased.

This magnetic field crosses the raceway interior between and across the conductors and penetrates the raceway wall.

The magnetic lines of flux composing the magnetic field are assumed to flow into the raceway wall at one magnetic pole and flow circumferentially around the pipe within the raceway wall to the other magnetic pole.

A portion of the magnetic lines of flux within the raceway wall are assumed to flow clockwise, and another portion counter-clockwise, in getting around the raceway wall from one magnetic pole to the other.

The whole magnetic field is caused to rotate about and diagonally across the conductors and within the raceway by the alternations of the currents in the three conductors, and the speed of rotation depends upon the frequency of the current alternations, while the direction of rotation depends upon the direction of the phase rotation of the current.

At an alternating frequency of 60 cycles per second, the depth of penetration of the magnetic field into the interior of the raceway wall is relatively shallow, the major portion of the magnetic flux flowing in a thickness on the raceway wall interior of the order of sixty to ninety mils depth.

It will be appreciated that, inasmuch as the cable conductors are merely loosely encased within the raceway, they will lie in the bottom of the raceway when the latter is disposed in a horizontal plane or at some angle other than vertical. Thus, the conductors will be eccentric with respect to the raceway cross-section and will be closer to the bottom of the raceway interior than to the top of the raceway interior.

The close proximity of the raceway wall to the conductors causes a greater density of magnetic flux to pass between conductors which simultaneously are carrying currents in opposite directions than would occur if the magnetic raceway wall did not surround the conductors or was further removed from the conductors. This increase of density of magnetic flux lines between conductors increases the reactance of the circuit.

The alternating current resistance of the circuit is also increased, due to greater induced voltages within the conductors causing an apparently greater inequality in density of load current flow through the conductor cross-section.

The magnetic flux passing between conductors which are simultaneously carrying currents in opposite directions penetrates the raceway wall at the magnetic poles. Therefore, as the magnetic field rotates, magnetic lines of flux are cut by the stationary raceway wall at the points on the wall where the magnetic lines of flux enter or leave the raceway wall in passing across the pipe interior between and across the conductors.

The voltage induced within the raceway wall by this cutting of magnetic flux causes induced currents to flow within the raceway wall, contributing to the losses within the circuit.

The losses within the cable and resistance and reactance of the cable circuit can be reduced and the cable circuit can carry more load current if a larger raceway is employed, or by moving the conductor group closer to the center of the raceway, while still maintaining the same configuration of the conductor group. However, the use of larger raceways or of supports within the raceway for maintaining the conductor group more nearly central of the raceway is relatively expensive.

With my invention similar results are obtained without increasing the physical size of the raceway and without providing additional supports to maintain the conductor group more central of the raceway.

Referring to the embodiment of my invention illustrated in Fig. 1: 2 designates a raceway, a steel pipe for example, encasing a group of insulated cable conductors 4. The conductors are loosely encased by the raceway and, as will be seen from the drawings, lie on the bottom of the raceway, so as to be eccentric with respect to the raceway cross-section.

In conventional manufacture of the raceway 2, a plate of metal is trimmed to the proper width and passed through sets of rolls to form the plate into a tube with a longitudinal slit down one side. The tube is then passed through welding rolls, which pass a high concentration of current cross the slit, causing the edges of the slit to be fused. The edges of the slit are then pressed together, extruding a small amount of plastic metal both on the outside and on the inside of the tube. This extruded metal is then trimmed off while plastic. The tube is then passed through rollers, which slightly reduces the diameter of the tube and accurately rounds and sizes the tube. The tube is then straightened.

In the embodiment of the invention illustrated in Fig. 1, I depart from this procedure in that, as the lips 6 and 8 of the longitudinal slit are being brought together, I insert between them a strip 10 of non-magnetic material, such as non-magnetic stainless steel, copper, bronze, or other non-magnetic material. This non-magnetic strip is then fused to the lips 6 and 8, either separately or simultaneously. As an alternative, the non-magnetic strip 10 may be welded to lip 6 or 8 before forming the plate into a tube. As a further alternative, the non-magnetic strip 10 may be built up entirely by welding.

It is to be understood that, while I have shown but one magnetic strip 10, several placed at intervals about the tube would be more beneficial, but the use of a plurality of strips instead of a single one will be dictated by economy.

The raceway is, of course, made in sections, and, when installing these sections, they will be oriented so that the non-magnetic strips 10 of the several sections will be aligned with each other and so that they will be at the bottom of the raceway and thus be in the area of the raceway wall which is closest to the conductor group 4.

In operation, when polyphase alternating current is passed through the cable conductors and the magnetic field is created within the raceway wall, the presence of the non-magnetic strip 10 within that portion of the raceway wall closest to the conductor group increases the magnetic reluctance of the portion of the raceway wall containing the strip. The effect on the magnetic field, therefore, is similar to that which would be obtained were this portion of the raceway wall further removed from the conductor group. Therefore, there is a decrease of density of lines of magnetic flux in the portion of pipe wall containing the strip and also a decrease in density of lines of magnetic flux passing between the conductors which are simultaneously carrying load currents in opposite directions. This change in the magnetic field due to the strip causes a decrease in the resistance and reactance of the circuit, and the circuit will carry more load current due to the raceway wall construction.

In the embodiment of my invention illustrated in Fig. 2, longitudinal slits 12 are formed radially in the interior of the raceway wall. These slits extend from end to end of each raceway section, and when the raceway is installed, the sections are oriented so that the slitted portion of the raceway will lie at the bottom and closest to the conductor group 4.

The slits 12 may be provided over the total inside periphery of the raceway, if desired, but for best results they should be substantially closer together in the portions of the raceway wall in closest proximity to the conductor group.

The slits 12 can be formed in the plate prior to forming the plate into a tube. On the other hand, the slits can be formed after the plate is tubed by expanding cutter wheels against the tube interior and pulling them through the tube. A multiple number of cutter wheels may be used in tandem to obtain the desired depth of slit. The interior of the raceway should be smoothed after forming the slits, to remove protruding edges and to smooth the raceway interior, thereby to facilitate installation of the cable conductors.

The operation of this embodiment of my invention is similar to that described in connection with Fig. 1.

It is to be understood that it is within the contemplation of my invention to use the non-magnetic strip 10 and the slits 12 together in the same raceway This construction has been illustrated in the fragmentary view Fig. 3.

It is to be understood that changes may be made in the details of construction and arrangement of parts hereinabove described within the purview of my invention.

What I claim is:

1. A raceway of magnetic metal for the reception of a power frequency polyphase electric power cable, and a plurality of relatively narrow slits on the interior of the raceway wall, said slits extending the length of the raceway and radially partially through the raceway wall.

2. A raceway of magnetic metal for the reception of a power frequency polyphase electric power cable, a seam of non-magnetic metal extending the length of the raceway and radially through the raceway wall, and a plurality of relatively narrow slits on the interior of the raceway wall, said slits extending the length of the raceway and radially partially through the raceway wall, said raceway being oriented to place the seam at the bottom.

3. A power frequency polyphase electric power cable system, comprising in combination a raceway of magnetic metal, a plurality of insulated cable conductors loosely disposed within the raceway eccentrically thereto, and a plurality of relatively narrow slits on the interior of the portion of the raceway wall in closest proximity to the conductors, said slits extending the length of the raceway and radially partially through the raceway wall.

4. A power frequency polyphase electric power cable system, comprising in combination a raceway of magnetic metal, a plurality of insulated cable conductors loosely disposed within the raceway eccentrically thereto, a seam of non-magnetic metal extending the length of the raceway and radially through the raceway wall, and a plurality of relatively narrow slits on the interior of the raceway wall extending the length of the raceway and radially partially through the raceway wall, said seam and slits being disposed in the portion of the raceway wall in closest proximity to the said conductors.

References Cited in the file of this patent
UNITED STATES PATENTS

| Number | Name | Date |
| --- | --- | --- |
| 284,959 | Halkyard | Sept. 11, 1883 |
| 403,262 | Garland | May 14, 1889 |
| 898,858 | Feldmann et al. | Sept. 15, 1908 |
| 1,313,054 | Berry | Aug. 12, 1919 |
| 1,781,093 | Affel | Nov. 11, 1930 |
| 2,250,239 | Sonnenfeld | July 22, 1941 |
| 2,417,785 | Slepian | Mar. 18, 1947 |
| 2,433,181 | White | Dec. 23, 1947 |